(12) United States Patent
Mizoguchi et al.

(10) Patent No.: US 6,381,125 B1
(45) Date of Patent: Apr. 30, 2002

(54) PERSONAL COMPUTER

(75) Inventors: Tetsuya Mizoguchi, Hino; Masayuki Sato, Ome, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 9 days.

(21) Appl. No.: 09/624,887

(22) Filed: Jul. 24, 2000

(30) Foreign Application Priority Data

Jul. 29, 1999 (JP) .......................................... 11-215356

(51) Int. Cl.⁷ ................................................. G06F 1/16
(52) U.S. Cl. ...................... 361/682; 361/683; 361/678; 364/708.1; 312/223.1
(58) Field of Search ................................ 361/681–683, 361/679, 678, 708; 364/708.1; 345/179, 180, 174, 905; 248/917–922, 923, 157, 101, 420, 346.03, 346.04; 349/58; 312/223.1–223.6; 178/18, 19, 18.01–18.11, 19.01–19.07

(56) References Cited

U.S. PATENT DOCUMENTS

| | | | | |
|---|---|---|---|---|
| 5,107,402 A | * | 4/1992 | Malgouires | 361/393 |
| 5,229,920 A | * | 7/1993 | Spaniol et al. | 361/393 |
| 5,494,447 A | * | 2/1996 | Zaidan | 439/31 |
| 6,016,171 A | * | 1/2000 | Tsao | 348/836 |
| 6,064,373 A | * | 5/2000 | Ditzik | 345/173 |
| 6,076,786 A | * | 6/2000 | Meyer | 248/161 |
| 6,134,103 A | * | 10/2000 | Ghanma | 361/681 |
| 6,198,624 B1 | * | 3/2001 | Margaritis | 361/681 |
| 6,229,693 B1 | * | 5/2001 | Karidis et al. | 361/681 |
| 6,233,138 B1 | * | 5/2001 | Osgood | 361/681 |
| 6,233,139 B1 | * | 5/2001 | Hamon | 361/681 |

FOREIGN PATENT DOCUMENTS

| | | | | |
|---|---|---|---|---|
| JP | | 6-318289 | 11/1994 | |
| JP | | 9-292932 | 11/1997 | |
| JP | | 02000284850 A | * 3/1999 | ............. G06F/1/16 |

* cited by examiner

Primary Examiner—Darren Schuberg
Assistant Examiner—Michael Datskovsky
(74) Attorney, Agent, or Firm—Finnegan, Henderson, Farabow, Garrett & Dunner, L.L.P.

(57) ABSTRACT

A personal computer includes a main unit including a computer circuit therein, and a flat panel display unit supported in a standing state by the main unit through a connecting section. The connecting section includes a lower strut attached to the main unit, and an upper strut attached to the display unit and combined with the lower strut such that the lower and upper struts are movable relative to each other. The upper strut is provide with a rack and is biased upward by a spring. The lower strut is provided with a stopper arranged to engage with the rack. The display unit is placed at an arbitrary height when the positions of the first and upper struts are changed relative to each other, and are fixed by the stopper.

7 Claims, 7 Drawing Sheets

PERSONAL COMPUTER

CROSS-REFERENCE TO RELATED APPLICATIONS

This application is based upon and claims the benefit of priority from the prior Japanese Patent Application No. 11-215356, filed Jul. 29, 1999, the entire contents of which are incorporated herein by reference.

BACKGROUND OF THE INVENTION

The present invention relates to a personal computer provided with a flat panel display, such as an LCD (Liquid Crystal Display) or a plasma display, which can have its height adjusted.

Conventionally, a CRT (Cathode Ray Tube) display device is widely used as a display device for a personal computer. However, CRT display devices are inconvenient in that they are big, heavy, bulky, and consume a lot of power.

Under such circumstances, techniques for flat panel displays, such as LCDs or plasma displays, have been making remarkable progress in recent years. For example, LCD devices can have a display color number of 16,900,000 and a display size of 15 inches or more, which can compare with the performance of CRT display devices. Furthermore, in recent years, various kinds of LCD devices, which have a thin profile and small power consumption, have been developed. As a result, LCD devices have been adopted for the display of personal computers. On the other hand, manufacturing techniques for personal computers of the desktop type have been also making progress to allow mounting of the computers to be highly integrated. As a result, it is possible to arrange the main circuit section of a computer in the support mechanism, or the pedestal casing of a display unit.

Generally, a flat panel display unit is arranged for a personal computer, as follows. In the case of a personal computer of the desktop type, an LCD casing is rotatably supported by an LCD support mechanism, which is independent of the main body in structure. In the case of a personal computer of the notebook type, the lower portion of an LCD casing is rotatably supported by the main body through a hinge. However, conventionally, neither personal computers of the desktop type nor the notebook type have any mechanism to adjust the height of the display unit.

In this respect, Jpn. Pat. Appln. KOKAI Publication No. 9-292932 discloses a portable information-processing apparatus having a height-adjustable display panel. In this apparatus, the display panel is arranged between a pair of slide members extending from the main unit and is movable up and down. This arrangement is conceived not only to place the display panel at a desirable height for an operator, but also to easily check sheets of paper delivered from a printer at the rear side of the apparatus. This arrangement, however, is not sufficient to make the whole apparatus compact, to protect the display panel, or to easily operate the apparatus, in light of flat panel display units of the next generation which are increasing in size.

BRIEF SUMMARY OF THE INVENTION

Accordingly, an object of the present invention is to improve a personal computer provided with a flat panel display unit, so as to make the whole apparatus compact, to protect the display panel, and to easily operate the apparatus.

According to a first aspect of the present invention, there is provided a personal computer comprising:

a keyboard;

a main unit including a computer circuit for controlling various operations of the personal computer;

a display unit arranged to be operated by the computer circuit, and including a display area for displaying information inputted from the keyboard;

a support member for supporting the display unit such that the display unit is supported to the main unit thorough the support member;

a stand portion arranged on the main unit to support the support member of the display unit; and an adjusting mechanism provided to the stand portion, for adjusting height position of the display unit by supporting the support member to be movable up and down.

The computer according to the first aspect may be arranged such that the adjusting mechanism includes an elevating member, which is movable up and down relative to the main unit and supports the display unit, and locking means for locking the elevating member at an arbitrary height.

The computer according to the first aspect may be arranged such that the locking means includes a rack arranged on the elevating member to extend in a vertical direction, and a stopper arranged to detachably engage with the rack.

The computer according to the first aspect may be arranged such that the adjusting mechanism has an elevating member, which is movable up and down relative to the main unit and supports the display unit, and a rack-and-pinion mechanism for moving the elevating member up and down.

According to a second aspect of the present invention, there is provided a personal computer comprising:

a main unit including a keyboard for inputting various instructions and a computer circuit for controlling various operations;

a flat panel display unit arranged to be operated by the computer circuit on the basis of instructions inputted from the keyboard, and including a display area for displaying information inputted from the keyboard;

a stand portion through which the main unit supports the flat panel display unit to be rotatable and movable up and down;

an elevating mechanism arranged on a back of the flat panel display unit reverse to the display area, for moving the flat panel display unit up and down relative to the stand portion while the stand portion stands on the main unit; and an adjusting mechanism provided to the stand portion, for adjusting height of the flat panel display unit, which is moved up and down by the elevating mechanism.

The computer according to the second aspect may be arranged such that the adjusting mechanism has an elevating member, which is arranged on the back of the flat panel display unit to be movable up and down relative to the stand portion, and includes a rack arranged thereon, and a stopper arranged to engage with the rack and lock the elevating member at an arbitrary height.

According to a third aspect of the present invention, there is provided a personal computer comprising:

a keyboard for inputting various instructions;

a main unit including a computer circuit for controlling various operations;

a flat panel display unit arranged to be operated by the computer circuit on the basis of instructions inputted from the keyboard, and including a display area for displaying information inputted from the keyboard;

a stand portion arranged on the main unit and supporting the flat panel display unit; and a support member arranged on a back of the flat panel display unit reverse to the display area, for engaging with the stand portion such that the flat panel display unit is supported by the main unit, wherein the support member is arranged to detachably engage with the stand portion having a plurality of engaging portions to engage therewith, such that height of the flat panel display unit is adjustable.

According to a fourth aspect of the present invention, there is provided a personal computer comprising:

a main unit having a computer circuit;

a display unit arranged to be operated by the computer circuit;

a stand-connecting section for supporting the display unit to be movable up and down on the main unit;

a processing section for displaying a specific operation button on the display unit;

a pointing device for designating the operation button displayed on the display unit; and a driving mechanism for adjusting height of the stand-connecting section, when the specific operation button is designated by the pointing device.

The computer according to the fourth aspect may be arranged such that the stand-connecting section has a strut standing on the main unit, an elevating member, which is movable up and down relative to the strut and supports the display unit, and a ball screw mechanism, which includes a ball screw shaft arranged to move the elevating member up and down and a ball screw nut arranged to engage with the ball screw shaft.

The computer according to the fourth aspect may be arranged such that the driving mechanism has adjusting means for continuously adjusting the height of the stand-connecting section while the specific operation button is designated by the pointing device.

The computer according to the fourth aspect may be arranged such that the specific operation button has first and second operation buttons, such that the height of the stand-connecting section is continuously adjusted to move the display unit up while the first operation button is designated by the pointing device, and the height of the stand-connecting section is continuously adjusted to move the display unit down while the second operation button is designated by the pointing device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
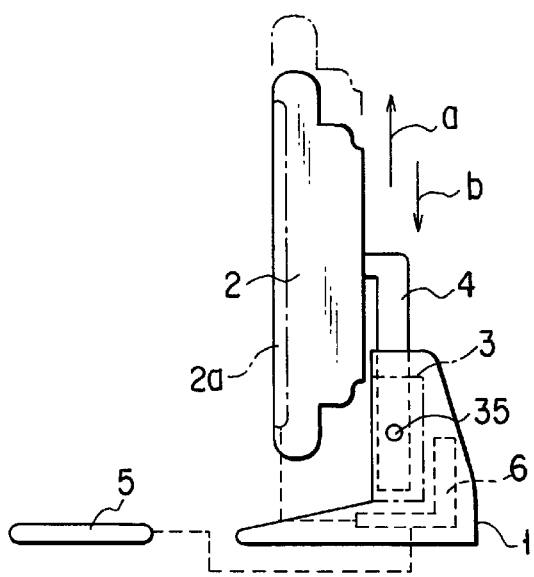
FIG. 1 is a side view showing the main structure of a computer according to a first embodiment of the present invention.

Embodiments of the present invention will be described hereinafter with reference to the accompanying drawings. In the following description, the constituent elements having substantially the same function and arrangement are denoted by the same reference numerals, and a repetitive description will be made only when necessary.

Figure 2:
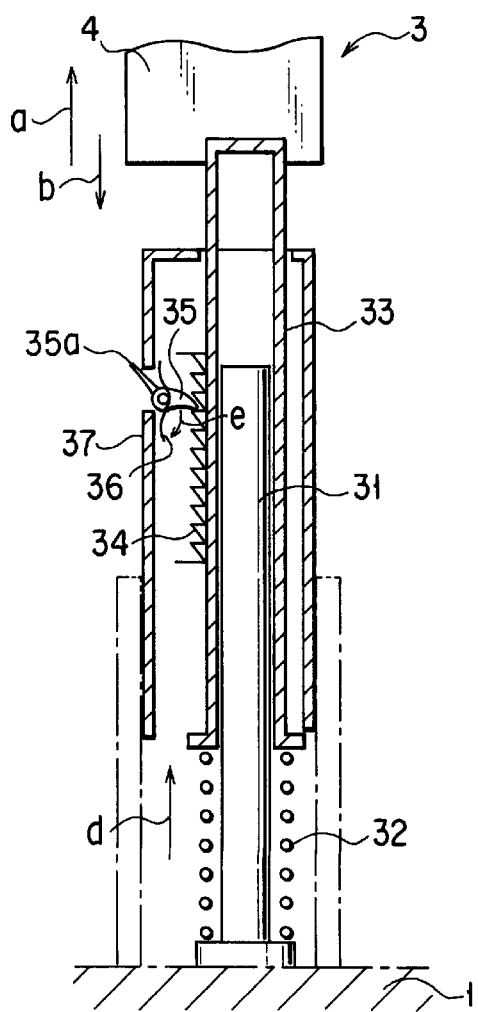
FIG. 2 is a cross-sectional view showing the connecting section shown in FIG. 1.
Figure 3:
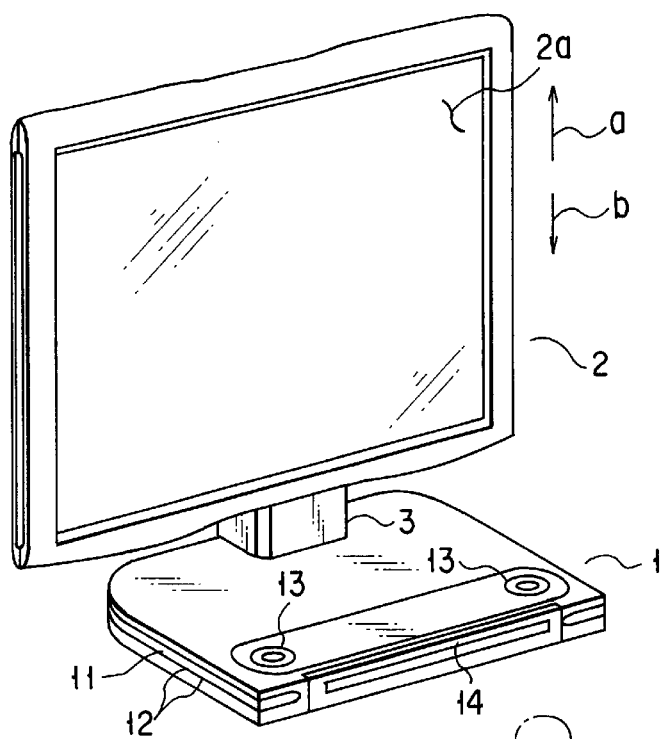
FIG. 3 is a perspective view showing the appearance of the computer according to the first embodiment.

First, an explanation will be given of a first embodiment of the present invention, with reference to FIGS. 1 to 3. In the first embodiment, a mechanism for adjusting the display height is applied to a personal computer of the desktop type. FIG. 1 is a side view showing the main structure of the computer according to the first embodiment of the present invention. FIG. 2 is a cross-sectional view showing the connecting section shown in FIG. 1. FIG. 3 is a perspective view showing the appearance of the computer according to the first embodiment.

In FIG. 1, there is shown a main unit 1 including therein a computer circuit 6, which functions as the hub of the computer main body. The computer circuit 6 is electrically connected to a keyboard 5 for inputting instructions. The keyboard 5 is constructed as a member independent of the main unit 1. The computer circuit 6 is also electrically connected to an LCD (Liquid Crystal Display) panel or display area 2a, which is controlled and driven by the computer circuit 6. The LCD panel 2a is mounted in a flat pane display unit 2.

The display unit 2 is connected to the main unit 1 through a connecting section 3. The connecting section 3 is arranged to stand upright on the casing of the main unit 1 that functions as a base of the display unit 2. The connecting section 3 includes a first portion or stand portion (a lower strut 31, a cover 37, etc.) attached to the main unit 1, and a second portion or support member (an upper strut 4, an elevating cylinder 33, etc.) attached to the display unit 2. The first and second portions are arranged to be changeable in their relative positions in the vertical direction, thereby allowing the display unit 2 to be moved up and down.

The connecting section 3 includes the lower strut 31 fixed to the main unit 1, as shown in FIG. 2. A compressive spring 32 is loosely fitted on the lower part of the lower strut 31 and functions as a biasing member and a shock absorber. The elevating cylinder or elevating member 33 is fitted on the lower strut 31 and is biased upward by the compressive spring 32.

The elevating cylinder 33 is provided with a rack 34 on the outer side surface along its axial direction. The rack 34 has teeth consisting of horizontal faces defining a plurality of engaging levels, and inclined faces connecting the horizontal faces. On the other hand, the cover 37, which surrounds the first portion and is fixed relative to the lower strut 31, is provided with a stopper or engaging claw 35 which has an arc shape and is pivotally mounted to engage with the rack 34. The distal end of the stopper 35 engages with the horizontal faces of the rack 34, while it is biased clockwise (in the direction of an arrow e) by a coil spring 36.

The elevating cylinder 33 is movable up and down (in the directions of arrows a and b) in a predetermined range, along with the upper strut 4. The elevating cylinder 33 is guided by the lower strut 31 and is biased upward (in the direction of the arrow a) by the compressive spring 32. The stopper 35 is operated to swing by a lever 35a formed integrally therewith, so that the stopper 35 engages with and disengages from the rack 34, thereby stopping the rack 34 at an arbitrary position. In other words, with this operation, the display unit 2 can have its height adjusted through the elevating cylinder 33 and the upper strut 4.

Note that, in FIG. 3, there are shown circuit parts 11 to 14 exposed to the outside of the casing of the main unit 1, i.e., a power button 11, microphone terminal 12, speaker 13, and a CD-ROM unit 14.

In the computer shown in FIGS. 1 to 3, the display unit 2 is supported at an arbitrary height above the main unit 1 by the connecting section 3. The display unit 2 is supported by the main unit 1 in a standing state through the connecting section 3, in which the main unit 1 functions as a support base in the standing state. The connecting section 3 forms a single strut structure, such that the strut structure and the display unit 2 have vertical central axes substantially aligned with each other.

Where the height of the display unit 2 is adjusted upward (in the direction of the arrow a), the lever 35a of the stopper 35 is operated to rotate counterclockwise. With this operation, the stopper 35 pivots about the center on the cover 37 against the action of coil spring 36, so that an engagement between the stopper 35 and the rack 34 is released. When the engagement is released, the elevating cylinder 33 is moved upward (in the direction of the arrow a) along with the upper strut 4 and the display unit 2, which are integratedly connected thereto, by the biasing force of the compressive spring 32. The biasing force of the compressive spring 32 may be preset so as to require an assistant operation of slightly lifting the display unit 2 at this time.

When the display unit 2 reaches a desired height, the lever 35a is released, so that the stopper 35 re-engages with the horizontal face of a tooth of the rack 34. With this operation the display unit 2 is fixed at the desired height thus adjusted.

On the other hand, where the height of the display unit 2 is adjusted downward (in the direction of the arrow b), the display unit 2 is pushed down with a small force. With this operation, the display unit 2 is moved downward (in the direction of the arrow b) along with the upper strut 4 and the elevating cylinder 33, against the biasing force of the compressive spring 32. Note that, where the display unit 2 is moved downward, it is not necessary to operate the stopper 35 to rotate counterclockwise, so that an engagement between the stopper 35 and the rack 34 is released. This is because, the stopper 35 does not prevent the rack 34 from moving downward. Specifically, the rack 34 can move downward relative to the stopper 35, while the inclined faces of teeth of the rack 34 smoothly move along the curved back of the arched stopper 35, but causing the stopper 35 to slightly pivot.

As described above, in the personal computer according to the first embodiment, the display unit 2 can be adjusted to an arbitrary height by a compact mechanism, thereby providing the best operation environment at any given time. As the compressive spring 32 is used as a biasing member and a shock absorber, the display unit 2 can not only have its height easily adjusted, but can be can be also prevented from receiving an unnecessary impact.

Note that, in the above-described embodiment, a gas spring may be used in place of the compressive spring 32. In this case, the flat panel display unit 2 can be smoothly moved up and down.

Figure 4:
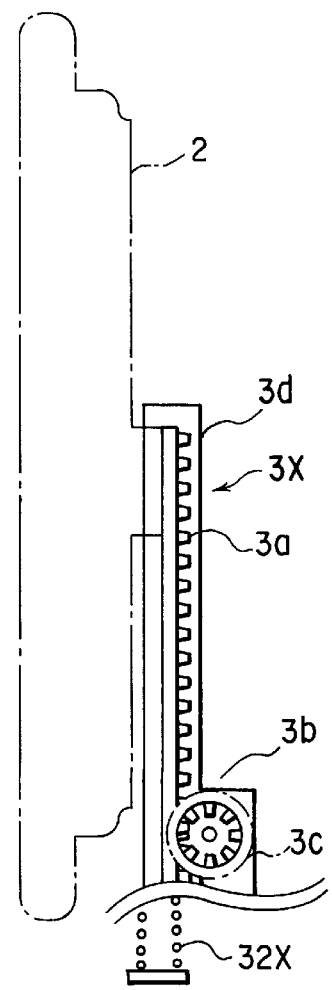
FIG. 4 is a view showing a connecting section according to a second embodiment of the present invention.

Next, an explanation will be given of a second embodiment of the present invention, with reference to FIG. 4. In the second embodiment, a combination of a rack and a pinion is used for a height-adjusting mechanism in the connecting section of a personal computer, which is of the desktop type as in the first embodiment. FIG. 4 is a view showing the connecting section according to the second embodiment of the present invention.

A flat panel display unit 2 is connected to a main unit 1 (see FIG. 3) through a connecting section 3X. The connecting section 3X is arranged to stand upright on the casing of the main unit 1 that functions as a base of the display unit 2. The connecting section 3 includes a rack 3a in a first portion or stand portion attached to the main unit 1, and a pinion 3b in a second portion or support member attached to the display unit 2.

The rack 3a is movable up and down in a certain range, while it engages with the pinion 3b and is guided by the slide rail of a guide 3d. The display unit 2 is supported at the top of the rack 3a. A spring 32X is arranged under the rack 3a and functions as a shock absorber, so that the display unit 2 can be prevented from receiving an unnecessary impact.

The pinion 3b is rotatably mounted on the outer casing of the connecting section, and is operable by a knob 3c. When the pinion 3b is rotated, the rack 3a is moved up and down along with the display unit 2 supported at the top thereof. In other words, the display unit 2 supported at the top of the rack 3a can be adjusted to an arbitrary height by rotating the knob 3c.

In this structure using the connecting section 3X with the rack 3a and the pinion 3b, the display unit 2 can be adjusted to an arbitrary height by a simple operation, thereby providing the best operation environment: at any given time.

Figure 5:
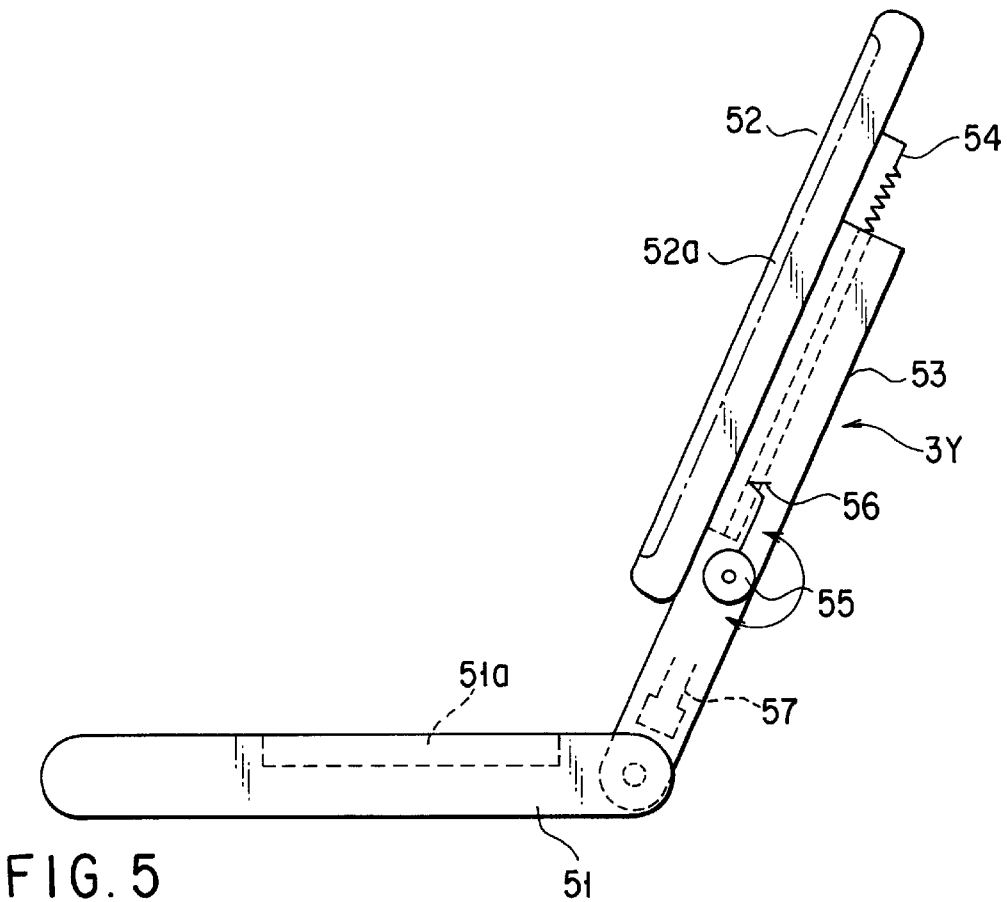
FIG. 5 is a side view showing the main structure of a computer according to a third embodiment of the present invention.
Figure 6:
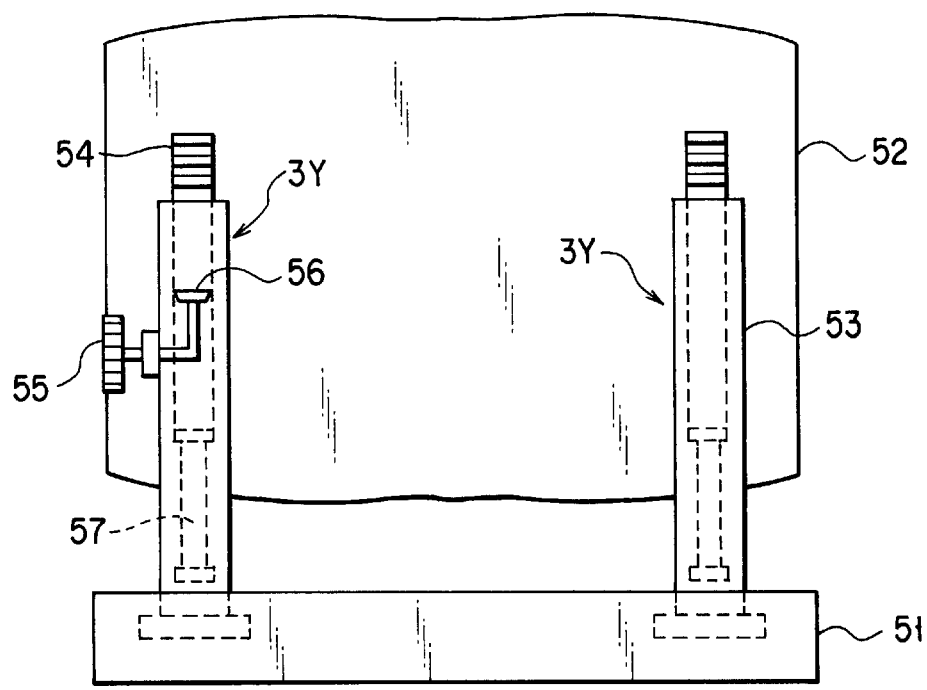
FIG. 6 is a rear view showing the main structure of the computer according to the third embodiment.

Next, an explanation will be given of a third embodiment of the present invention, with reference to FIGS. 5 and 6. In the third embodiment, a height-adjusting mechanism for a display according to the present invention is applied to a personal computer of the notebook type. FIG. 5 is a side view showing the main structure of the computer according to the third embodiment of the present invention. FIG. 6 is a rear view of the computer.

In FIGS. 5 and 6, there is shown a main unit 51 including therein a computer circuit, which functions as the hub of the computer main body. A keyboard 51a for inputting instructions into the computer circuit is arranged on the upper surface of the main unit 51. Furthermore, a flat panel display unit 52 including, e.g., an LCD panel or display area 52a, which is operated by the computer circuit, is rotatably mounted on the main unit 51 through a connecting section 3Y. The keyboard 51a can be covered with the display unit 52 by rotating the display unit 52.

The connecting section 3Y includes a first portion or stand portion attached to the main unit 51 and formed of a pair of right and left arms 53 which are rotatably mounted on the rear side of the casing of the main unit 51 by hinges. The connecting section 3Y also includes a second portion or support member attached to the display unit 52 and formed of racks 54 arranged on the back of the display unit 52.

The racks 54 are longitudinally guided in the arms 53 that are hollow to form guides. Each of the racks 54 is biased upward by a compressive spring 57, which is disposed in the lower part of the arm 53 and functions as a biasing member and a shock absorber. One of the arms 53 is provided with a stopper or engaging claw 56 pivotally mounted thereon to engage with the corresponding rack 54. The stopper 56 is swung by a knob 55 integratedly connected thereto, so that the stopper 56 engages with and disengages from the rack 54, thereby stopping the rack 54 at an arbitrary position. In other words, with this operation, the display unit 52 can have its height adjusted by the rack 54.

More specifically, in the computer shown in FIGS. 5 and 6, where the height of the display unit 52 is adjusted upward, the knob 55 is operated, so that an engagement between the stopper 56 and the corresponding rack 54 is released. When the engagement is released, both the racks 54 are moved upward along with the display unit 52 by the biasing force of the compressive springs 57. The biasing force of the compressive springs 57 may be preset so as to require an assistant operation of slightly lifting the display unit 52 at this time.

On the other hand, where the height of the display unit 52 is adjusted downward, the display unit 52 is pushed down with a small force. With this operation, the display unit 52 is moved downward along with the racks 54 against the biasing force of the compressive springs 57.

When the display unit 52 reaches a desired height, the knob 55 is operated, so that the stopper 56 re-engages with the rack 54. With this operation the display unit 52 is fixed at the desired height thus adjusted.

As described above, in the personal computer according to the third embodiment, the display unit 52 can be adjusted to an arbitrary height by a compact mechanism, thereby providing the best operation environment at any given time. As the compressive springs 57 are used as a biasing member and a shock absorber, the display unit 52 can not only have its height easily adjusted, but can be also prevented from receiving an unnecessary impact.

Figure 7:
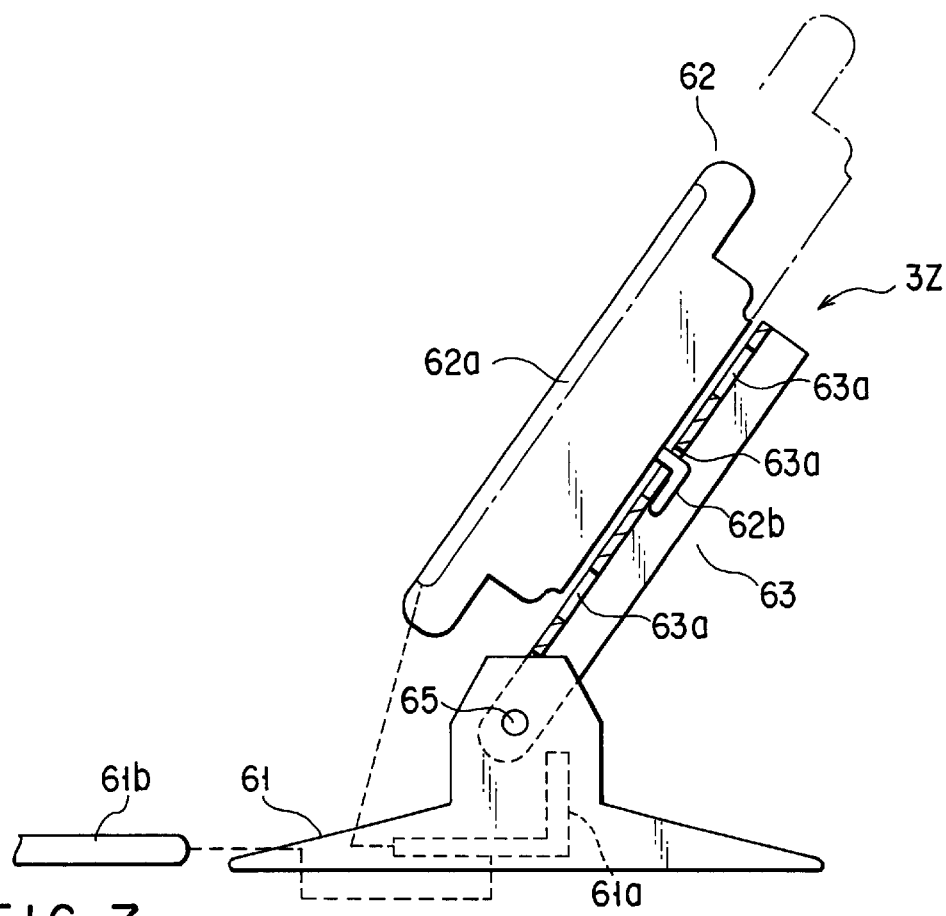
FIG. 7 is a side view showing the main structure of a computer according to a fourth embodiment of the present invention.

Next, an explanation will be given of a fourth embodiment of the present invention, with reference to FIG. 7. In the fourth embodiment, a display unit can be attached to a main unit selectively at an arbitrary height, and also can be detached from the main unit and placed at an arbitrary position, e.g., hung on a wall. FIG. 7 is a side view showing the main structure of a computer according to the fourth embodiment of the present invention.

In FIG. 7, there is shown a main unit 61 including computer circuit 61a, which functions as the hub of the computer main body. A keyboard 61b for inputting instructions is electrically connected to the computer circuit 61a by a line or communicating means. The keyboard 61b is arranged as a member separated from the main unit.

Furthermore, an LCD panel or display area 62a, which is operated by the computer circuit 61a, is connected to the circuit 61a by a line or communicating means. The LCD panel 62a is mounted on a flat panel display unit 62. The display unit 62 is detachably supported by the main unit 61 through a connecting section 3Z.

The connecting section 3Z includes a first portion or stand portion attached to the main unit 61 and formed of a pair of right and left arms 63 that are rotatably mounted on the main unit 61 by hinges. Each of the arms 63 is provided with a plurality of engaging portions or holes 63a at certain intervals in the vertical or longitudinal direction. The connecting section 3Z also includes a second portion or support member attached to the display unit 62 and formed of a pair of hooks 62b attached to the back of the display unit 62. The hooks 62b can engage with an arbitrary pair of holes 63a of the arms 63.

In the computer shown in FIG. 7, where the height of the display unit 62 is adjusted, the hooks 62b on the back of the display unit 62 are caused to engage with a selected pair of holes 63a of the arms 63. With this operation, the display unit 62 is placed above the main unit 61 at a desired height. Since the display unit 62 is detachable from the main unit 61, the display unit 62 can be placed at an arbitrary position distant from the main unit 61, e.g., hung on a wall.

As described above, in the personal computer according to the fourth embodiment, the display unit 62 can be adjusted to an arbitrary height, and also can be detached from the main unit 61 and placed at an arbitrary position, thereby providing the best operation environment at any given time.

Next, an explanation will be given of a fifth embodiment of the present invention, with reference to FIGS. 8 to 11. In the fifth embodiment, a height-adjusting mechanism arranged in a connecting section comprises a ball-screw mechanism formed of a ball screw shaft and a ball screw nut. Furthermore, there is provided a processing section for displaying specific operation buttons on a flat panel display unit and allowing a pointing device, which is used for inputting into the computer circuit a designated position on a picture displayed by the display unit, to designate the operation buttons, so as to adjust the height of the display unit.

Figure 8:
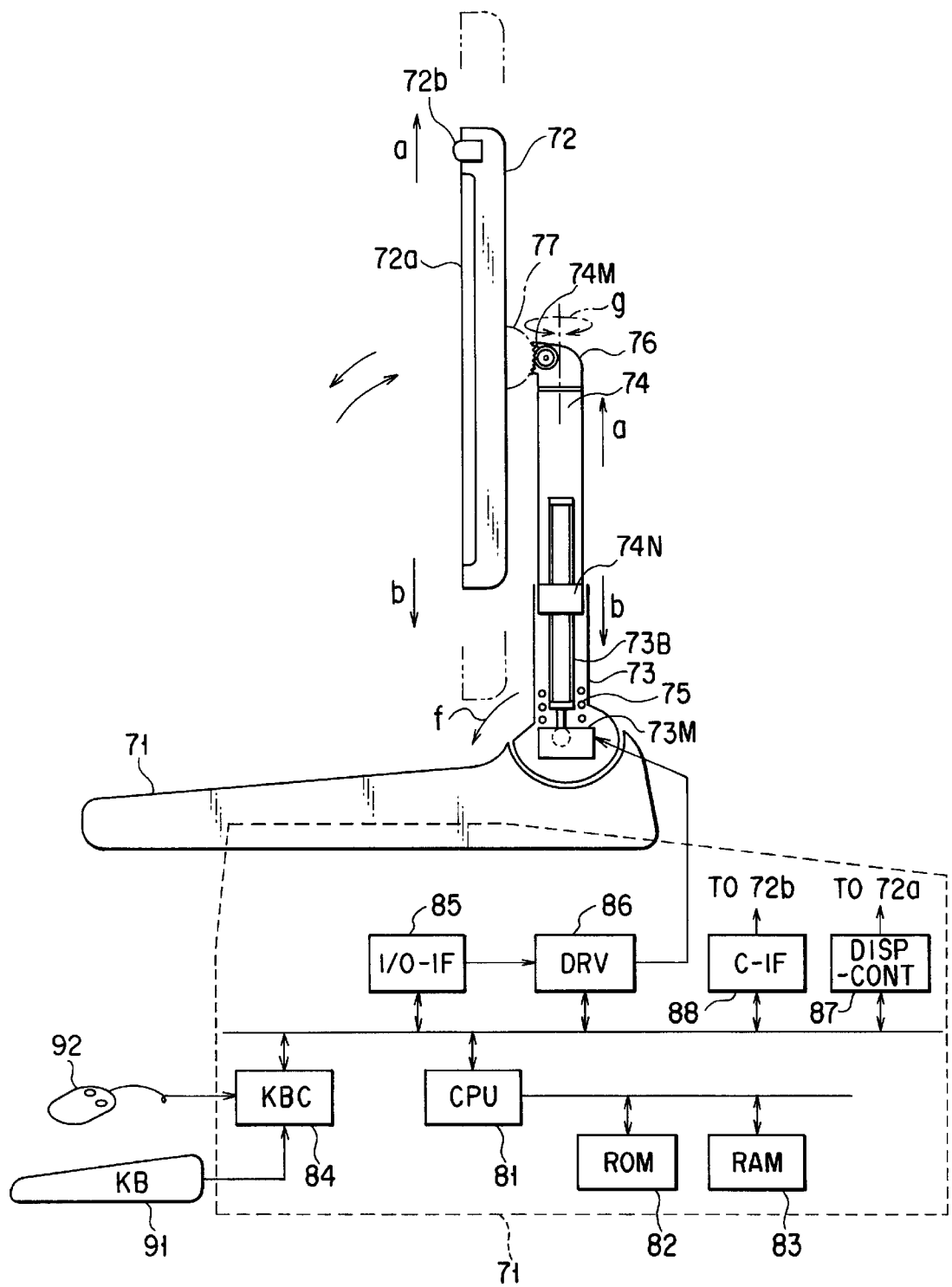
FIG. 8 is a side view showing the main structure of a computer according to a fifth embodiment of the present invention, along with a block diagram showing the computer circuit arranged in the main unit.

FIG. 8 is a side view showing the main structure of a computer according to the fifth embodiment of the present invention, along with a block diagram showing the computer circuit arranged in the main unit.

In FIG. 8, there is shown a main unit 71 including therein a computer circuit (81 to 88), which functions as the hub of the computer main body. A flat panel display unit 72 is connected to the main unit 71 through a connecting section. In the flat panel display unit 72, an LCD panel or display area 72a and an imaging camera 7b, which are controlled and driven by the computer circuit, are mounted.

The connecting section includes a lower strut 73 mounted on the top of the casing of the main unit 71 such that it can swing back and forth (in the direction of an arrow f) within a certain angle range. A ball screw shaft 73B and a motor 73M for driving the ball screw shaft 73B to rotate bi-directionally are arranged in the lower strut 73.

On the other hand, an upper strut 74 is connected to the back of the display unit 72, and is combined with the lower strut 73. A ball screw nut 74N is fixed in the upper strut 74 to engage with the ball screw shaft 73B. When the ball screw shaft 73B is rotated by the motor, 73M, the ball screw nut 74N is moved up and down along with the upper strut 74 and the display unit 72 integratedly formed therewith. A spring 75 is arranged under the ball screw shaft 73B and functions as a shock absorber, so that the display unit 72 can be prevented from receiving an unnecessary impact.

An angle joint 76 is attached to the top of the upper strut 74 to be rotatable about the axis of the strut 74 (in the direction of an arrow g). The display unit 72 is attached to the joint 76 through a support 77 to be swingable up and down. The display unit 72 is driven to rotate up and down along with the support 77 by a motor 74M arranged on the joint 76. In other words, the angle of the display unit 72 is adjusted by the motor 74M for the display unit 72 to face upward and downward.

Figure 10:
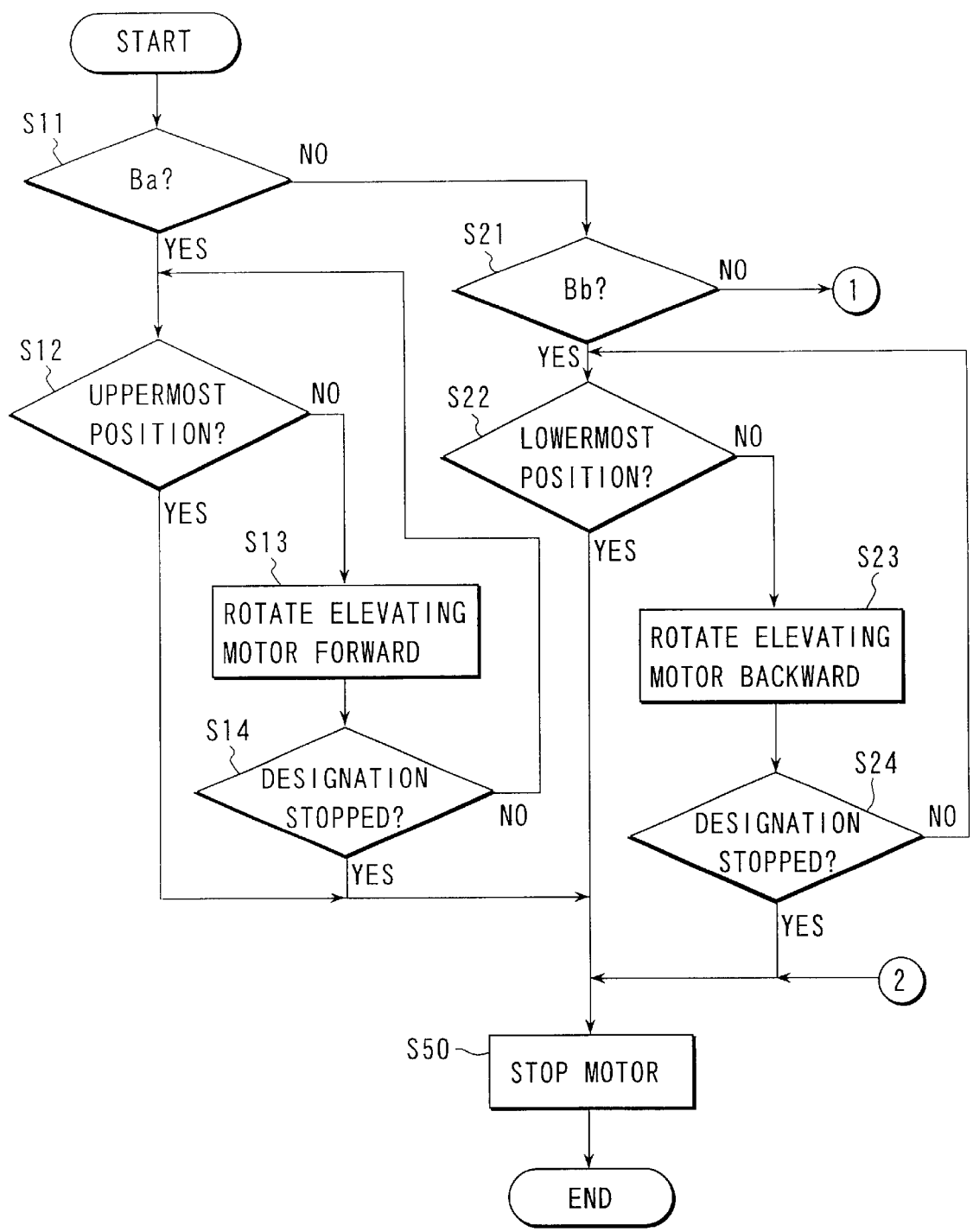
FIG. 10 is a flow chart showing one part of a process of adjusting the display position according to the fifth embodiment.
Figure 11:
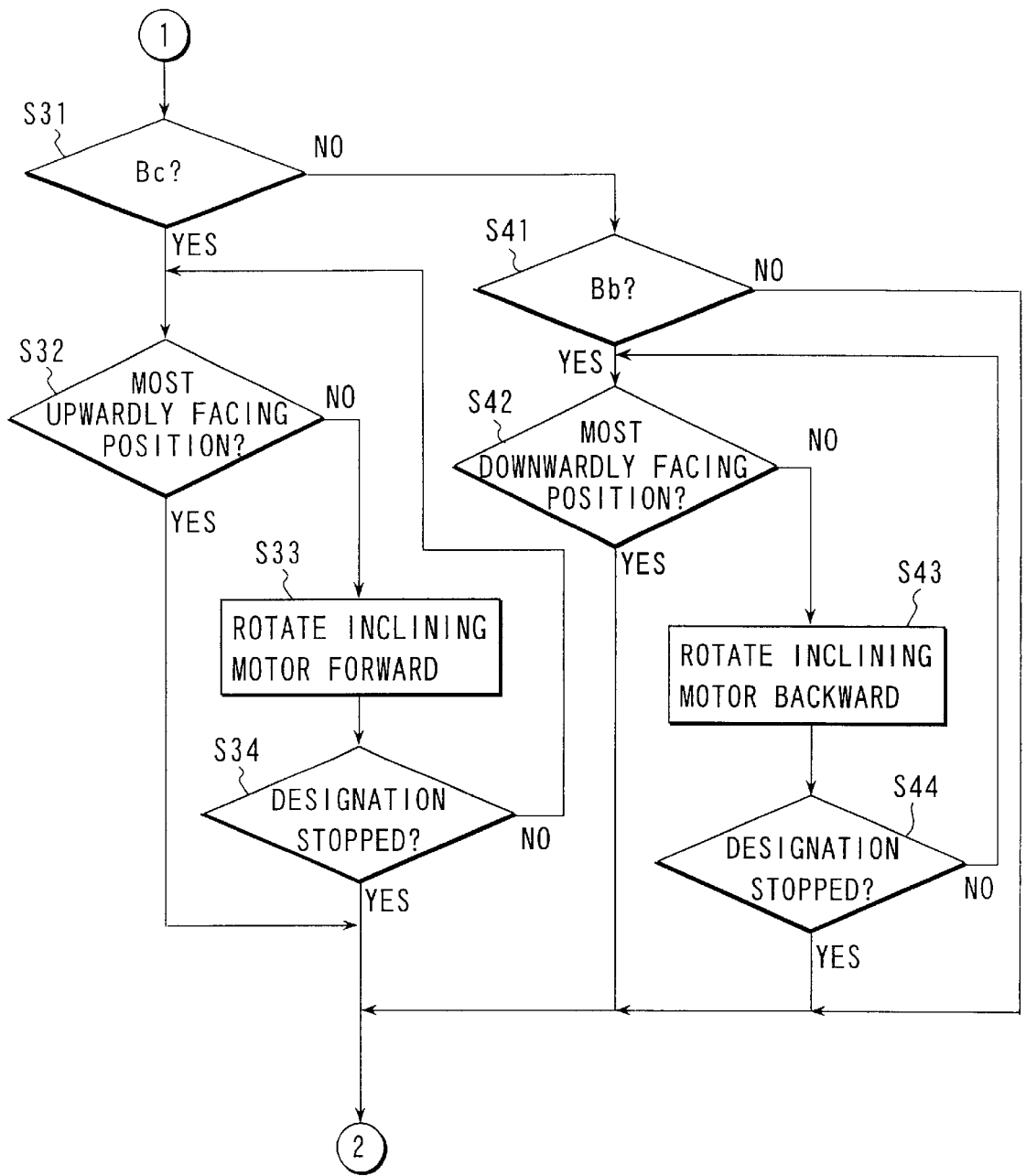
FIG. 11 is a flow chart showing the other part of the process of adjusting the display position according to the fifth embodiment.

The reference symbols 81 to 88 denote structural members of the computer circuit arranged in the main unit 71. A CPU 81 is configured to manage the control of the whole system, and, in the embodiment, perform processes of adjusting the display position, as shown in FIGS. 10 and 11. A ROM 82 is used for storing control programs performed by the CPU 81. A RAM is used as a storing area and a working area for programs performed by the CPU 81.

A keyboard controller (KBC) 84 is used for inputs made by an inputting device or pointing device, such as a mouse 92. An input/output interface (I/O-IF) 85 has an I/O register arranged to latch input/output data in accordance with processes of adjusting the display position. A motor driving circuit (DRV) 86 is configured to control the elevating motor 73M and the inclining motor 74M in accordance with registered contents in the input/output interface 85. A display unit controller (DISP-CONT) 87 is configured to control the LCD panel 72a. An image input processor (C-IF) 88 is used for processing images inputted from the imaging camera 72b.

Figure 9:
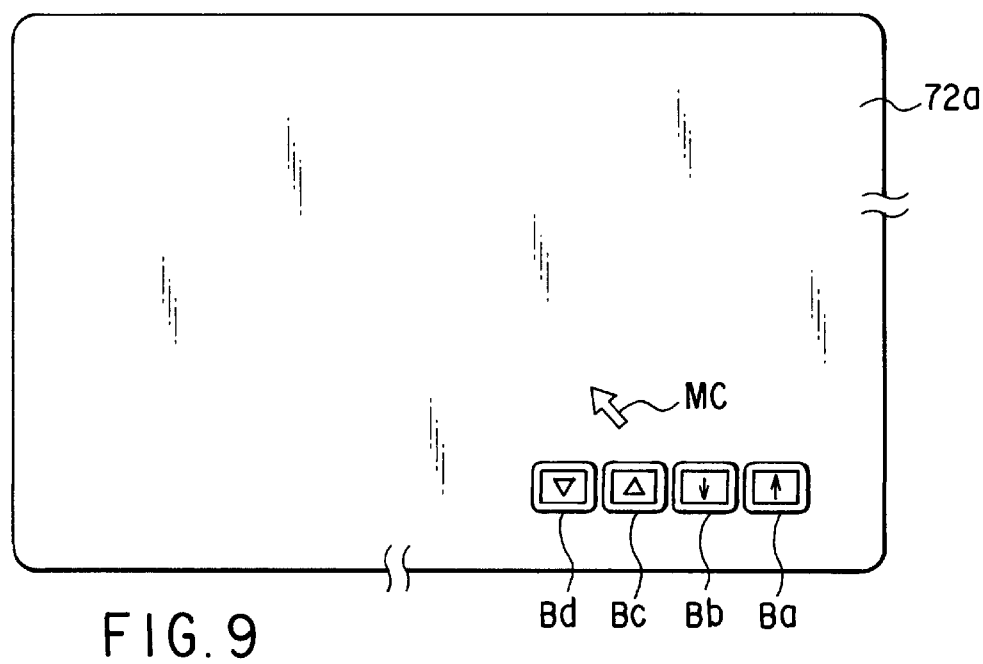
FIG. 9 is a view showing an example of specific displayed buttons according to the fifth embodiment.

FIG. 9 is a view showing an example of displaying specific buttons according to the fifth embodiment. In this example, a display ascent button Ba, a display decent button Bb, a display face-up button Bc, and a display face-down button Bd are displayed as the specific buttons on the LCD panel 72a. The specific buttons Ba to Bd can be designated by cursor operations through the mouse 92 or cursor keys on the keyboard (KB) 91. Using the specific buttons, the height and the face-angle of the display are controlled in accordance with processes of adjusting the display position, as shown in FIGS. 10 and 11.

An explanation will be given of operations according to the fifth embodiment with reference to FIGS. 8 to 11. FIGS. 10 and 11 show the flow chart of processes of adjusting the display position performed by the CPU 81.

First, it is supposed that a display ascent button Ba is designated by the mouse cursor MC of the mouse 92, from the specific buttons Ba to Bd displayed on the LCD panel 72a of the display unit 72 (Step S11 in FIG. 10). Then, it is confirmed whether the display unit 72 is currently located at the uppermost position (Step S12 in FIG. 10). If not, the elevating motor 73M is driven in the forward direction so long as the button Ba is being designated by the mouse 92 (Step S13 in FIG. 10), so that the display unit 72 is moved upward (in the direction of an arrow a). When the display unit 72 reaches a desired height, the designation of the button Ba by the mouse 92 should be stopped. Then, the elevating motor 73M is stopped, so that the display unit 72 is set at the desired height (Steps S14 and S15 in FIG. 10).

Next, it is supposed that a display ascent button Bb is designated by the mouse cursor MC of the mouse 92, from the specific buttons Ba to Bd displayed on the LCD panel 72a of the display unit 72 (Step S21 in FIG. 10). Then, it is confirmed whether the display unit 72 is currently located at the lowermost position (Step S22 in FIG. 10). If not, the elevating motor 73M is driven in the backward direction so long as the button Bb is being designated by the mouse 92 (Step S23 in FIG. 10), so that the display unit 72 is moved downward (in the direction of an arrow b). When the display unit 72 reaches a desired height, the designation of the button Bb by the mouse 92 should be stopped. Then, the elevating motor 73M is stopped, so that the display unit 72 is set at the desired height (Steps S24 and S25 in FIG. 10).

Next, it is supposed that a display ascent button Bc is designated by the mouse cursor MC of the mouse 92, from the specific buttons Ba to Bd displayed on the LCD panel 72a of the display unit 72 (Step S31 in FIG. 11). Then, it is confirmed whether the display unit 72 is currently located at the most upwardly facing position (Step S32 in FIG. 11). If not, the inclining motor 74M is driven in the forward direction so long as the button Bc is being designated by the mouse 92 (Step S33 in FIG. 11), so that the display unit 72 is moved to face more upward. When the display unit 72 reaches a desired angle, the designation of the button Bc by the mouse 92 should be stopped. Then, the inclining motor 74M is stopped, so that the display unit 72 is set at the desired angle (Steps S34 and S35 in FIG. 11).

Next, it is supposed that a display ascent button Bd is designated by the mouse cursor MC of the mouse 92, from the specific buttons Ba to Bd displayed on the LCD panel 72a of the display unit 72 (Step S41 in FIG. 11). Then, it is confirmed whether the display unit 72 is currently located at the most downwardly facing position (Step S42 in FIG. 11). If not, the inclining motor 74M is driven in the backward direction so long as the button Bd is being designated by the mouse 92 (Step S43 in FIG. 11), so that the display unit 72 is moved to face more downward. When the display unit 72 reaches a desired angle, the designation of the button Bd by the mouse 92 should be stopped. Then, the inclining motor 74M is stopped, so that the display unit 72 is set at the desired angle (Steps S44 and S45 in FIG. 11).

As described above, the personal computer according to the fifth embodiment includes a height-adjusting mechanism and an angle-adjusting mechanism for the display unit 72, which are operable on the display unit 72. Accordingly, the display unit 72 can be adjusted to an arbitrary height and an arbitrary inclined position by simple operations, thereby providing the best operation environment at any given time.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A personal computer comprising:
   a keyboard;
   a main unit including a computer circuit for controlling various operations of the personal computer;
   a display unit arranged to be operated by the computer circuit, and including a display area for displaying information inputted from the keyboard;
   a support member for supporting the display unit such that the display unit is supported to the main unit through the support member;
   a stand portion arranged on the main unit to support the support member of the display unit; and an adjusting mechanism provided to the stand portion for adjusting height position of the display unit by supporting the support member to be movable up and down;

wherein the adjusting mechanism includes an elevating member, which is movable up and down relative to the main unit and supports the display unit, and locking means for locking the elevating member at an arbitrary height; and wherein the locking means includes a rack arranged on the elevating member to extend in a vertical direction, and a stopper arranged to detachably engage with the rack.

2. A personal computer comprising:

a keyboard;

a main unit including a computer circuit for controlling various operations of the personal computer;

a display unit arranged to be operated by the computer circuit, and including a display area for displaying information inputted from the keyboard;

a support member for supporting the display unit is supported to the main unit through the support member;

a stand portion arranged on the main unit to support the support member of the display unit; and an adjusting mechanism provided to the stand portion for adjusting height position of the display unit by supporting the support member to be movable up and down;

wherein the adjusting mechanism has an elevating member, which is movable up and down relative to the main unit and supports the display unit, and a rack-and-pinion mechanism for moving the elevating member up and down.

3. A personal computer comprising:

a main unit including a keyboard for inputting various instructions and a computer circuit for controlling various operations;

a flat panel display unit arranged to be operated by the computer circuit on the basis of instructions inputted from the keyboard, and including a display area for displaying information inputted from the keyboard;

a stand portion through which the main unit supports the flat panel display unit to be rotatable and movable up and down, such that the keyboard is selectively covered with the display unit by rotating the display unit; and an adjusting mechanism provided to the stand portion, for adjusting height of the flat panel display unit, the adjusting mechanism including an elevating member arranged on a back of the flat panel display unit reverse to the display area, for moving the flat panel display unit up and down relative to the stand portion while the stand portion stands on the main unit, wherein the elevating member includes a rack arranged on the flat panel display unit, and a stopper arranged on the stand portion to engage with the rack and lock the elevating member at an arbitrary height.

4. A personal computer comprising:

a main unit having a computer circuit;

a display unit arranged to be operated by the computer circuit;

a stand-connecting section for supporting the display unit to be movable up and down on the main unit;

a processing section for displaying a specific operation button on the display unit;

a pointing device for designating the operation button displayed on the display unit; and a driving mechanism for adjusting height of the stand-connecting section, when the specific operation button is designated by the pointing device.

5. The computer according to claim 4, wherein the stand-connecting section has a strut standing on the main unit, an elevating member, which is movable up and down relative to the strut and supports the display unit, and a ball screw mechanism, which includes a ball screw shaft arranged to move the elevating member up and down and a ball screw nut arranged to engage with the ball screw shaft.

6. The computer according to claim 4, wherein the driving mechanism has adjusting means for continuously adjusting the height of the stand-connecting section while the specific operation button is designated by the pointing device.

7. The computer according to claim 4, wherein the specific operation button has first and second operation buttons, such that the height of the stand-connecting section is continuously adjusted to move the display unit up while the first operation button is designated by the pointing device, and the height of the stand-connecting section is continuously adjusted to move the display unit down while the second operation button is designated by the pointing device.

* * * * *